(12) United States Patent
Katsura et al.

(10) Patent No.: US 8,979,683 B2
(45) Date of Patent: Mar. 17, 2015

(54) BICYCLE ELECTRIC ACTUATOR UNIT

(75) Inventors: Takafumi Katsura, Osaka (JP);
Kazutaka Niki, Osaka (JP)

(73) Assignee: Shimano Inc., Osaka (JP)

( * ) Notice: Subject to any disclaimer, the term of this patent is extended or adjusted under 35 U.S.C. 154(b) by 588 days.

(21) Appl. No.: 13/362,160

(22) Filed: Jan. 31, 2012

(65) Prior Publication Data

US 2013/0192405 A1    Aug. 1, 2013

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/10 | (2006.01) |
| B62M 25/08 | (2006.01) |

(52) U.S. Cl.
CPC .............. B62M 25/08 (2013.01); B62M 9/105 (2013.01); *Y10T 74/2003* (2013.01)
USPC .............................................. 474/80; 474/82

(58) Field of Classification Search
CPC ...... B62M 9/126; B62M 25/08; B62M 9/125; B62M 9/136; B62M 9/1248
USPC ...................................................... 474/80, 82
See application file for complete search history.

(56) References Cited

U.S. PATENT DOCUMENTS

| | | | | |
|---|---|---|---|---|
| 4,946,425 A | * | 8/1990 | Buhlmann | 474/80 |
| 4,952,196 A | * | 8/1990 | Chilcote et al. | 474/70 |
| 5,211,583 A | * | 5/1993 | Endo et al. | 439/595 |
| 5,254,044 A | * | 10/1993 | Anderson | 474/70 |
| 5,328,414 A | * | 7/1994 | Ancarani Restelli | 474/80 |
| 5,480,356 A | * | 1/1996 | Campagnolo | 474/70 |
| 5,494,307 A | * | 2/1996 | Anderson | 280/236 |
| 5,664,966 A | * | 9/1997 | Maegawa et al. | 439/595 |
| 5,723,924 A | * | 3/1998 | Blanchet | 310/85 |
| 6,162,140 A | * | 12/2000 | Fukuda | 474/70 |
| 6,244,415 B1 | * | 6/2001 | Fujii | 192/217 |
| 6,293,882 B1 | * | 9/2001 | Kitamura et al. | 474/80 |
| 6,523,772 B2 | * | 2/2003 | Ueno | 242/400.1 |
| 6,623,389 B1 | * | 9/2003 | Campagnolo | 474/70 |
| 6,648,782 B2 | * | 11/2003 | Valle | 474/78 |
| 6,659,895 B2 | * | 12/2003 | Fukuda | 474/70 |
| 6,676,549 B1 | * | 1/2004 | Fukuda | 474/102 |
| 6,679,797 B2 | * | 1/2004 | Valle | 474/80 |
| 6,726,586 B2 | * | 4/2004 | Fukuda | 474/70 |
| 6,740,003 B2 | * | 5/2004 | Fukuda | 477/78 |
| 6,761,655 B2 | * | 7/2004 | Fukuda | 474/70 |
| 6,843,741 B2 | * | 1/2005 | Fujii | 474/70 |
| 6,857,975 B2 | * | 2/2005 | Kitamura | 474/70 |
| 6,899,649 B2 | * | 5/2005 | Ichida et al. | 474/70 |
| 6,945,888 B2 | * | 9/2005 | Fukuda et al. | 474/70 |
| 6,979,009 B2 | * | 12/2005 | Ichida et al. | 280/238 |
| 6,997,835 B2 | * | 2/2006 | Fukuda | 474/82 |
| 7,001,294 B2 | * | 2/2006 | Fukuda | 474/102 |
| 7,255,660 B2 | * | 8/2007 | Del Pra | 474/82 |
| 7,290,458 B2 | * | 11/2007 | Fukuda | 74/82 |
| 7,291,079 B2 | * | 11/2007 | Ichida et al. | 474/80 |
| 7,306,531 B2 | * | 12/2007 | Ichida et al. | 474/70 |

(Continued)

*Primary Examiner* — Henry Liu
(74) *Attorney, Agent, or Firm* — Global IP Counselors

(57) ABSTRACT

A bicycle electric actuator unit basically has a housing, an electric drive part and a cable holding member. The electric drive part is disposed in the housing and electrically connected to an electrical cable. The cable holding member is provided at an outer surface of the housing to hold a portion of the electrical cable. The bicycle electric actuator unit can be for example part of an electric bicycle component such as an electric front derailleur or an electric rear derailleur.

12 Claims, 9 Drawing Sheets

(56) References Cited

U.S. PATENT DOCUMENTS

| | | | |
|---|---|---|---|
| 7,320,655 B2 * | 1/2008 | Fukuda | 474/80 |
| 7,381,142 B2 * | 6/2008 | Campagnolo | 474/70 |
| 7,388,151 B2 * | 6/2008 | Nishimoto | 174/68.3 |
| 7,442,136 B2 * | 10/2008 | Ichida et al. | 474/82 |
| 7,467,567 B2 * | 12/2008 | Fukuda | 74/412 R |
| 7,503,863 B2 * | 3/2009 | Ichida et al. | 474/80 |
| 7,704,173 B2 * | 4/2010 | Ichida et al. | 474/82 |
| 7,740,115 B2 * | 6/2010 | Watarai | 188/24.22 |
| 7,779,724 B2 * | 8/2010 | Fujii | 74/551.8 |
| 7,850,556 B2 * | 12/2010 | Meggiolan | 474/70 |
| 7,892,122 B2 * | 2/2011 | Fukuda | 474/82 |
| 7,948,128 B2 * | 5/2011 | Pauli et al. | 310/71 |
| 7,980,974 B2 * | 7/2011 | Fukuda | 474/70 |
| 8,002,655 B2 * | 8/2011 | Meggiolan | 474/82 |
| 8,025,597 B2 * | 9/2011 | Takamoto | 474/70 |
| 8,033,937 B2 * | 10/2011 | Meggiolan | 474/70 |
| 8,066,597 B2 * | 11/2011 | Sakaue | 474/82 |
| 8,137,223 B2 * | 3/2012 | Watarai et al. | 474/110 |
| 8,202,182 B2 * | 6/2012 | Ishikawa et al. | 474/82 |
| 8,241,158 B2 * | 8/2012 | Ishikawa | 474/80 |
| 8,282,519 B2 * | 10/2012 | Ichida et al. | 474/82 |
| 2006/0288575 A1 * | 12/2006 | Davidson | 29/854 |
| 2010/0001599 A1 * | 1/2010 | Bohn et al. | 310/71 |

* cited by examiner

BICYCLE ELECTRIC ACTUATOR UNIT

BACKGROUND

1. Field of the Invention

This invention generally relates to a bicycle electric actuator unit. More specifically, the present invention relates to a bicycle electric actuator unit that can be, for example, part of an electric bicycle component such as an electric front derailleur or an electric rear derailleur.

2. Background Information

Recently, bicycles have been equipped with electrical components to make riding easier and more enjoyable for the rider. Some bicycles are equipped with electrically controlled shifting systems. Often these electrical components are provided with an electric drive part or unit that includes such parts as a motor or other drive device for adjusting the electrical component. Typically, a bicycles equipped with an electrical component is also provided with a control device for operation the electrical component and an electrical power supply such as a battery or a generator for supply electrical energy to the electrical component. Thus, an electrical cable is provided to interconnect the control device and/or the electrical power supply to the electrical component. The electrical cable is sometimes routed inside the bicycle frame, while in other circumstances, the electrical cable is run along the exterior of the frame and secured to the frame with suitable fasteners such as cable ties.

SUMMARY

In view of the state of the known technology, a bicycle electric actuator unit is disclosed herein that aids in routing an electrical cable along a desired cable path.

In one embodiment, a bicycle electric actuator unit is provided that basically comprises a housing, an electric drive part and a cable holding member. The electric drive part is disposed in the housing and electrically connected to an electrical cable. The cable holding member is provided at an outer surface of the housing to hold a portion of the electrical cable. The bicycle electric actuator unit can be for example part of an electric bicycle component such as an electric front derailleur or an electric rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
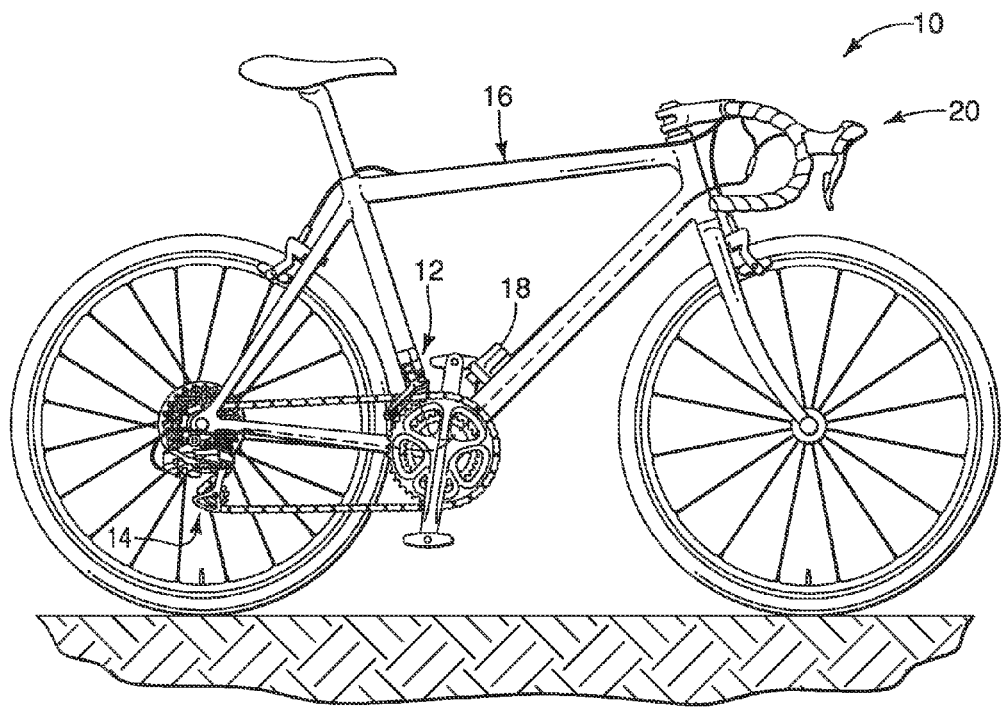
FIG. 1 is a side elevational view of a bicycle that is equipped with an electric front derailleur and an electric rear derailleur, which each have a bicycle electric actuator unit in accordance with one illustrative embodiment.

Referring initially to FIG. 1, a bicycle 10 is illustrated that is equipped with an electrically controlled shifting system. The electrically controlled shifting system includes a bicycle electric front derailleur 12 and a bicycle electric rear derailleur 14 in accordance with one illustrative embodiment. The front and rear derailleurs 12 and 14 are each mounted to a bicycle frame 16 of the bicycle 10 in a conventional manner. In the illustrative embodiment, the front and rear derailleurs 12 and 14 are motorized derailleurs, (i.e., each of the derailleurs 12 and 14 has a motor). The electrically controlled shifting system further includes a battery 18 and a pair of electric shifters 20 (only one illustrated in FIG. 1). The battery 18 is fixedly coupled to the bicycle frame 14 of the bicycle 10 with the battery 18 being easily removed from and reattached to the bicycle 10. The battery 18 is electrically coupled to the derailleurs 12 and 14 and the electric shifters 20 to supply electrical power thereto. The electric shifters 20 have electrical switches that electronically control the upshifting and downshifting of the derailleurs 12 and 14 to move a chain between front and rear chain sprockets of the bicycle 10, respectively, in a conventional manner. The battery 18 is a replaceable battery pack or a rechargeable battery. Since batteries and electric shifters are conventional electronic components in the bicycle field, further descriptions of the battery 18 and the electric shifters 20 have been omitted for the sake of brevity.

Figure 2:
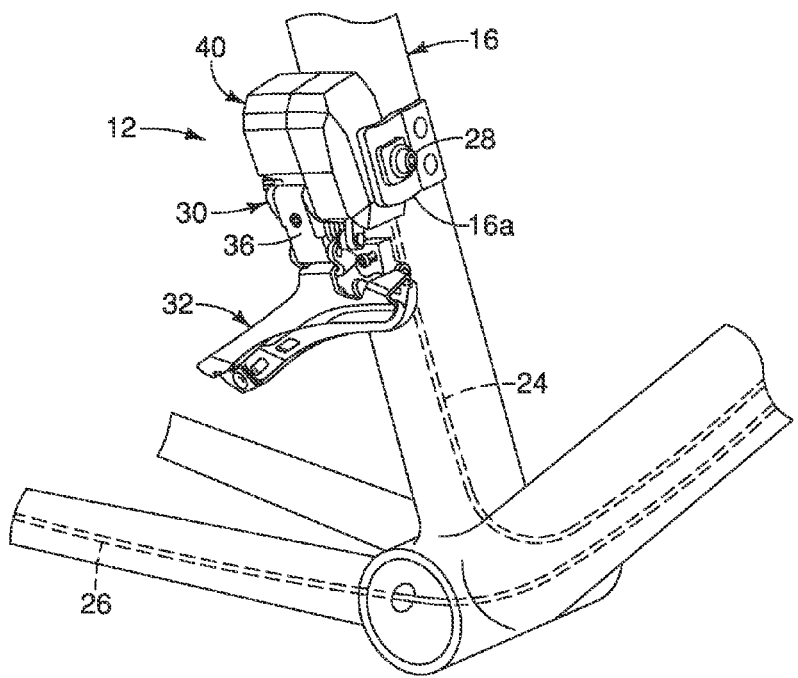
FIG. 2 is a front side perspective view of a portion of the bicycle illustrated in FIG. 1 that includes the front derailleur.
Figure 3:
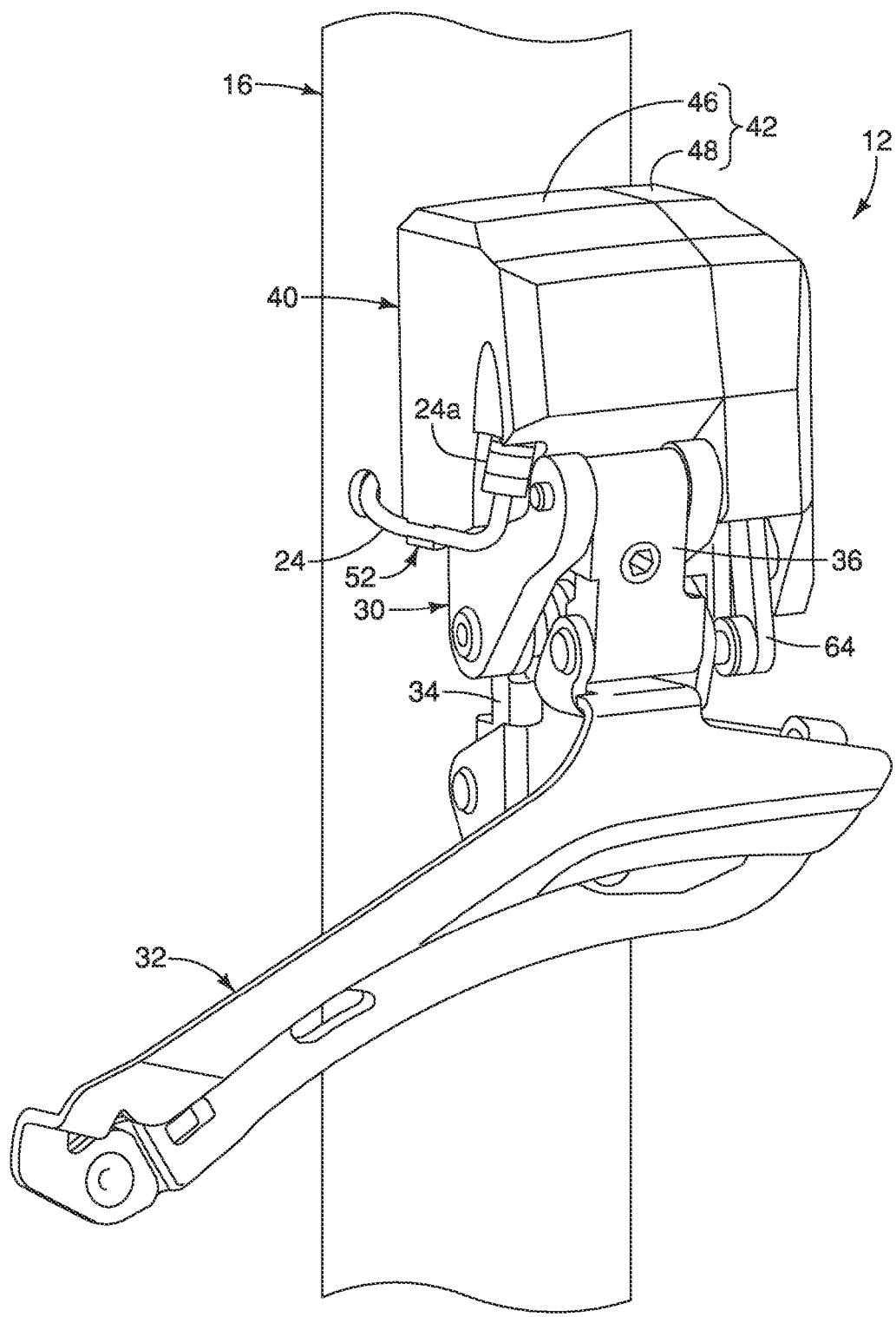
FIG. 3 is a rear side perspective view of a portion of the bicycle illustrated in FIG. 1 that includes the front derailleur.

Referring to FIGS. 1 and 2, a first electrical cable 24 extends from the front derailleur 12 to a control unit (not shown) to receive electrical power from the battery 18 and to receive shift signals from one of the electric shifters 20. Similarly, a second electrical cable 26 extends from the rear derailleur 14 to the control unit to receive electrical power from the battery 18 and receive shift signals from other of the electric shifters 20. Thus, the electrical cables 24 and 26 are multi-electrical conductor cables. In the illustrated embodiment, the electrical cables 24 and 26 are routed inside the bicycle frame 16. Alternatively, the electrical cables 24 and 26 can be run along the exterior of the bicycle frame 16 and secured to the bicycle frame 16 with suitable fasteners such as cable ties.

Figure 4:
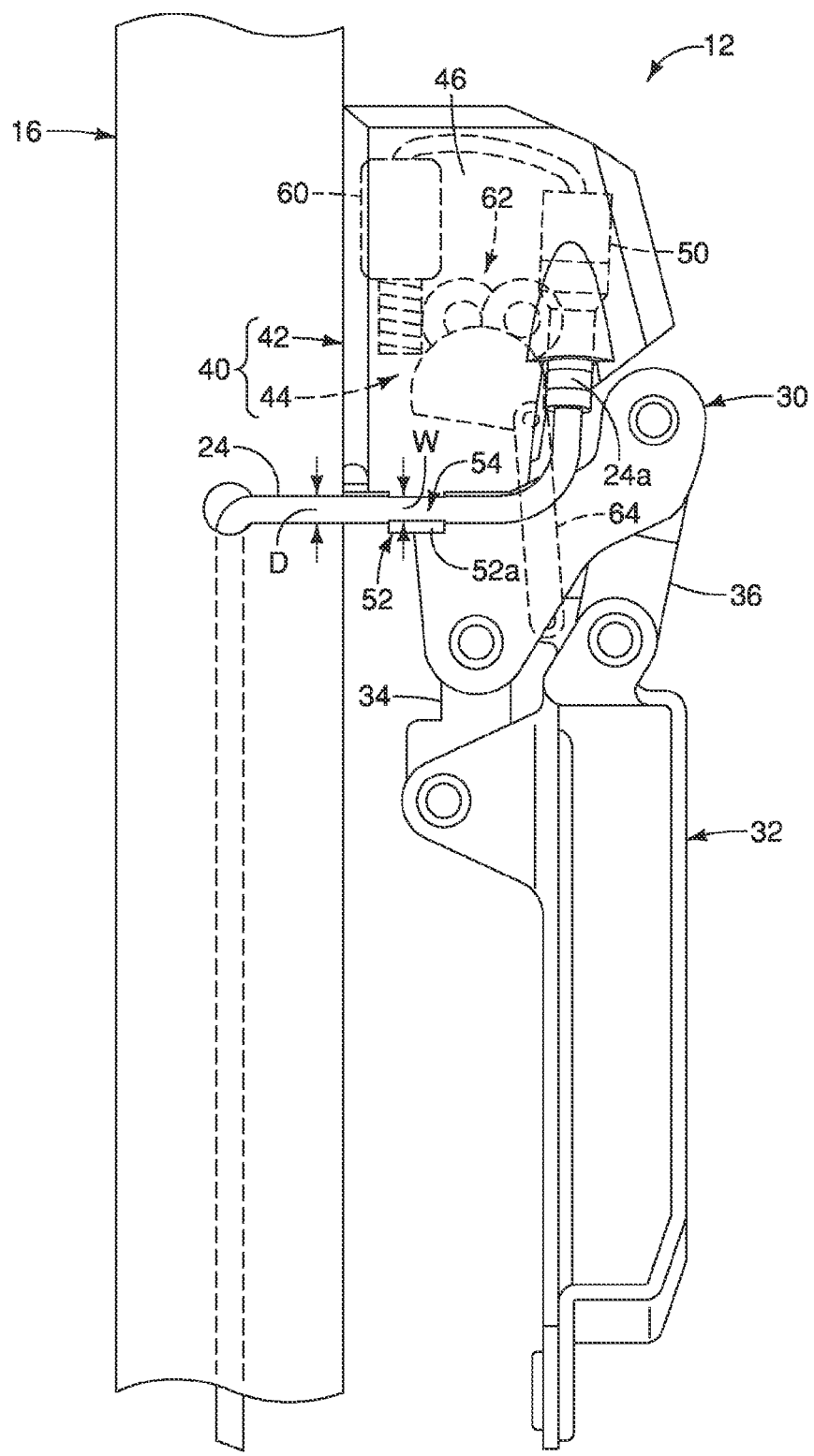
FIG. 4 is a rear side elevational view of the front derailleur and a portion of the seat tube of the bicycle with an electrical cable connected to the front derailleur using a cable connector arrangement.
Figure 5:
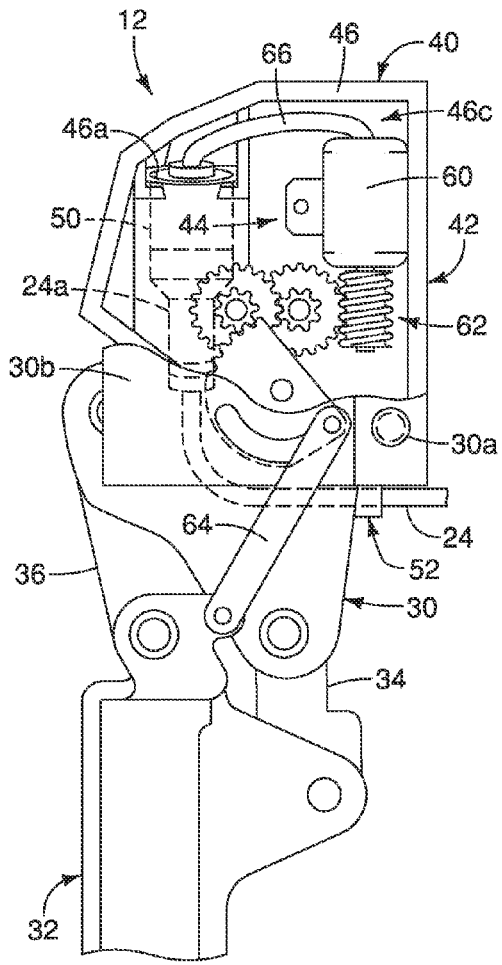
FIG. 5 is a front side elevational view of a portion of the front derailleur with the front cover of the housing removed and a portion of the base member broken away.
Figure 6:
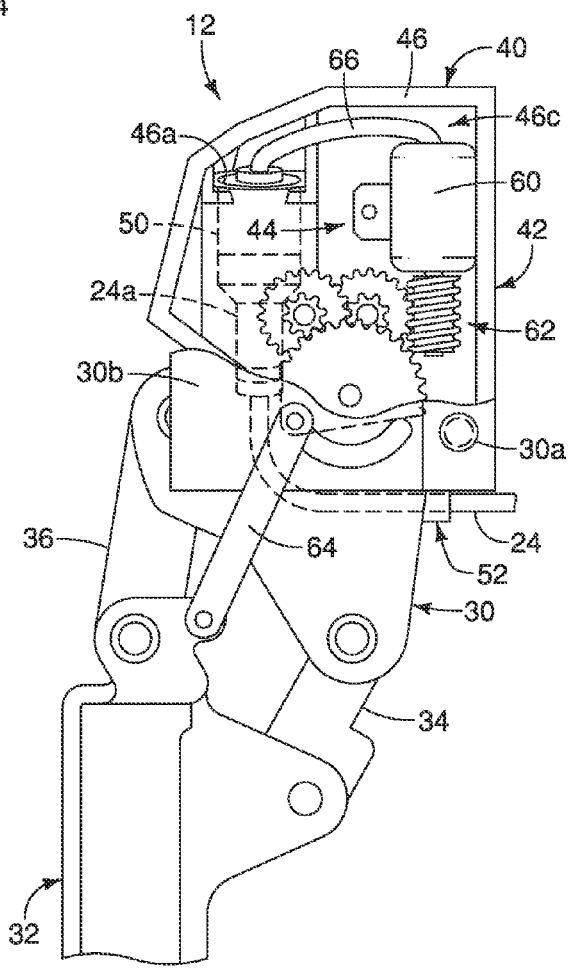
FIG. 6 is a front side elevational view of a portion of the front derailleur with the front cover of the housing removed and a portion of the base member broken away.
Figure 7:
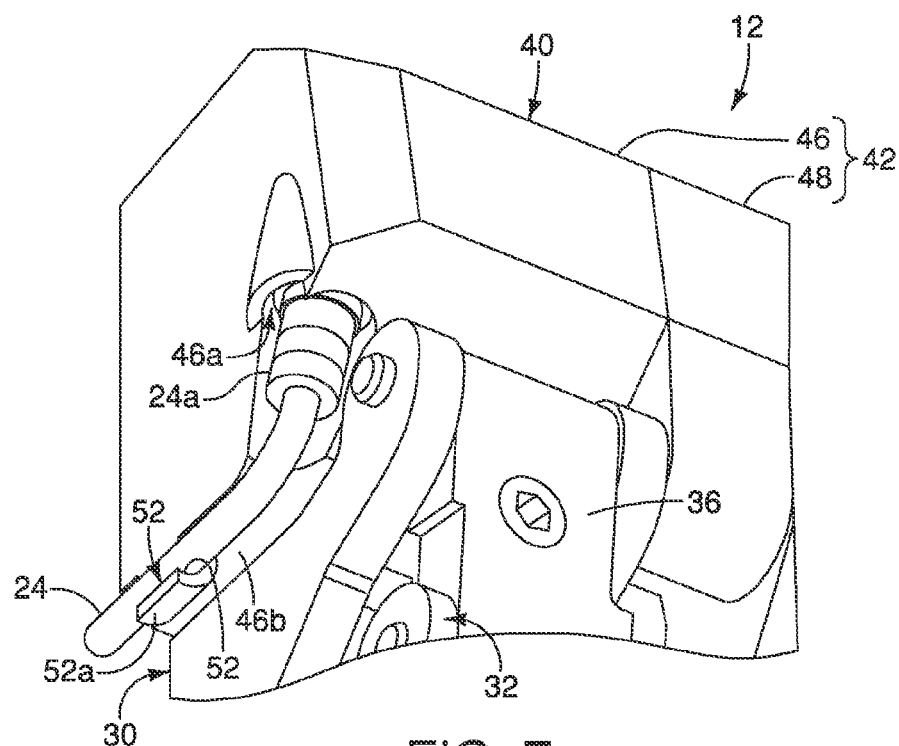
FIG. 7 is a rear side perspective view of a portion of the front derailleur as viewed from the bottom looking up.
Figure 8:
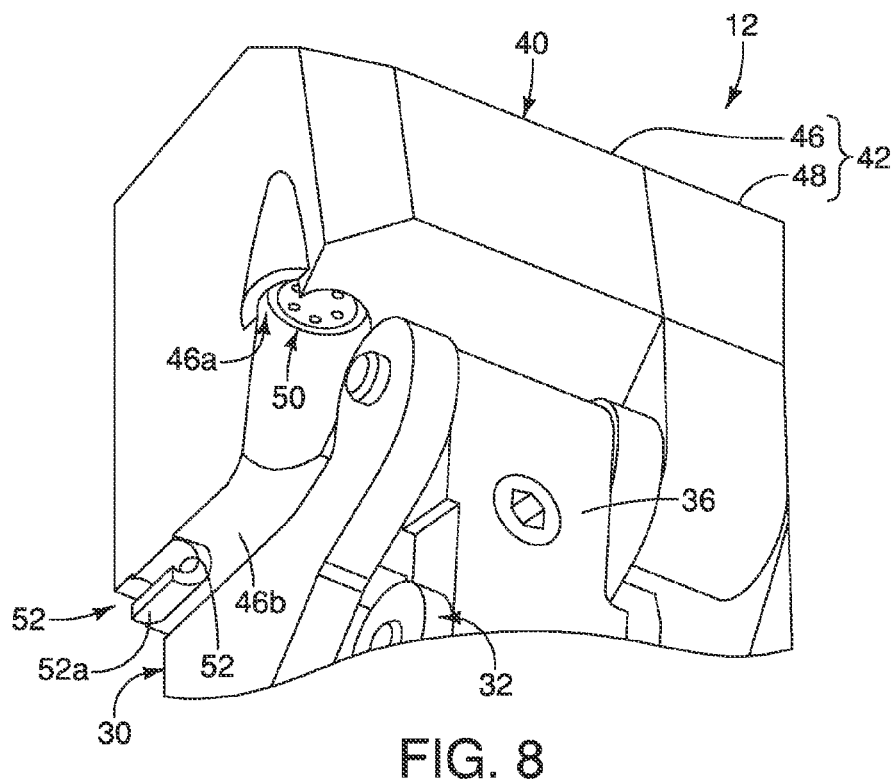
FIG. 8 is a rear side perspective view of the portion of the front derailleur illustrated in FIG. 7, but with the electrical cable removed to illustrate the a cable connector.

Referring to FIG. 2, the front derailleur 12 is fixed to a bracket 16a of the bicycle frame 16 by fastening member or fastener, e.g. a bolt 28. Of course, it will be apparent from this disclosure that other mounting configurations can be used as needed and/or desired. Referring now to FIGS. 2 to 6, the front derailleur 12 basically includes a base member 30 and a chain guide 32. The base member 30 is fixed to the bicycle frame 16 by the bolt 28 as seen in FIG. 2. In particular, as seen in FIGS. 5 and 6, the base member 30 has a portion with a threaded hole 30a. The threaded hole 30a receives the bolt 28 (FIG. 2) to secure the base member 30 to the bicycle frame 16. The chain guide 32 is movably supported to the base member 30 to move between a retracted position (FIG. 5) and an extended position (FIG. 6). Depending on the configuration of the bicycle, the chain guide 32 may be move to at least one intermediate position located between the retracted and extended positions. In the illustrated embodiment, the chain guide 32 is movably supported to the base member 30 by an inner link 34 and an outer link 36. The links 34 and 36 form a four bar linkage with the base member 30 and the chain guide 32. In other words, the links 34 and 36 have first ends pivotally mounted to the base member 30 and second ends pivotally mounted to the chain guide 32.

As seen in FIGS. 2 to 6, the base member 30 also supports a bicycle electric actuator unit 40 (hereinafter actuator unit 40). The base member 30 is a formed of a rigid material such as a lightweight metal and/or non-metallic material. Since the base member 30 is fixed to the bicycle frame 16 by the bolt 28, the base member 30 constitutes a fixed member with respect to the bicycle frame 16. As seen in FIGS. 5 and 6, the actuator unit 40 includes a housing 42 and an electric drive part 44. The chain guide 32 is operatively coupled to the electric drive part 44 of the actuator unit 40. In particular, the chain guide 32 is moved by the electric drive part 44 of the actuator unit 40 between the retracted and extended positions.

In the illustrated embodiment, the housing 42 basically includes aback cover 46 and a front cover 48. The back and front covers 46 and 48 are fastened together at least partially to enclose the electric drive part 44. The back and front covers 46 and 48 can be, for example, adhesively fastened together or fastened together by screws or other suitable fasteners. The back and front covers 46 and 48 are preferably formed of a lightweight non-metallic material such as generally rigid plastic material. The back cover 46 of the housing 42 has a cable opening 46a (FIGS. 5 to 8) that opens in a downward direction relative to the housing 42 with the actuator unit 40 in an installed position on the bicycle 10. The cable opening 46a provides access to the actuator unit 40 for electrically connecting the electrical cable 24 to the actuator unit 40.

When the back and front covers 46 and 48 are fastened together, the housing 42 is also preferably secured to the base member 30. The base member 30 has an actuator unit support 30b that is contained within the housing 42. The actuator unit support 30b is an upstanding wall of the base member 30, which is provided for supporting the actuator unit 40 within the housing 42. The configuration of the actuator unit support Mb depends on the configuration of the actuator unit 40. Since a variety of electric actuator units can be supported on the base member 30 within the housing 42, the actuator unit support 30b will not be discussed or illustrated in detail.

In the main illustrated embodiment, the housing 42 has a cable connector 50 that is installed in the cable opening 46a. The cable connector 50 faces in a downward direction relative to the housing 42 with the actuator unit 40 in the installed position. Preferably, the cable connector 50 is formed with a resilient outer cover or provided with a gasket for sealing the cable opening 46a to provide a watertight seal. The electrical cable 24 has a connecting part 24a that is detachably and reattachably connected to the cable connector 50 of the housing 42. In this way, the connecting part 24a of the electrical cable 24 can be plugged into the cable connector 50 and then subsequently unplugged from the cable connector 50, which remains secured in the cable opening 46a to provide a watertight seal for the housing 42.

Figure 9:
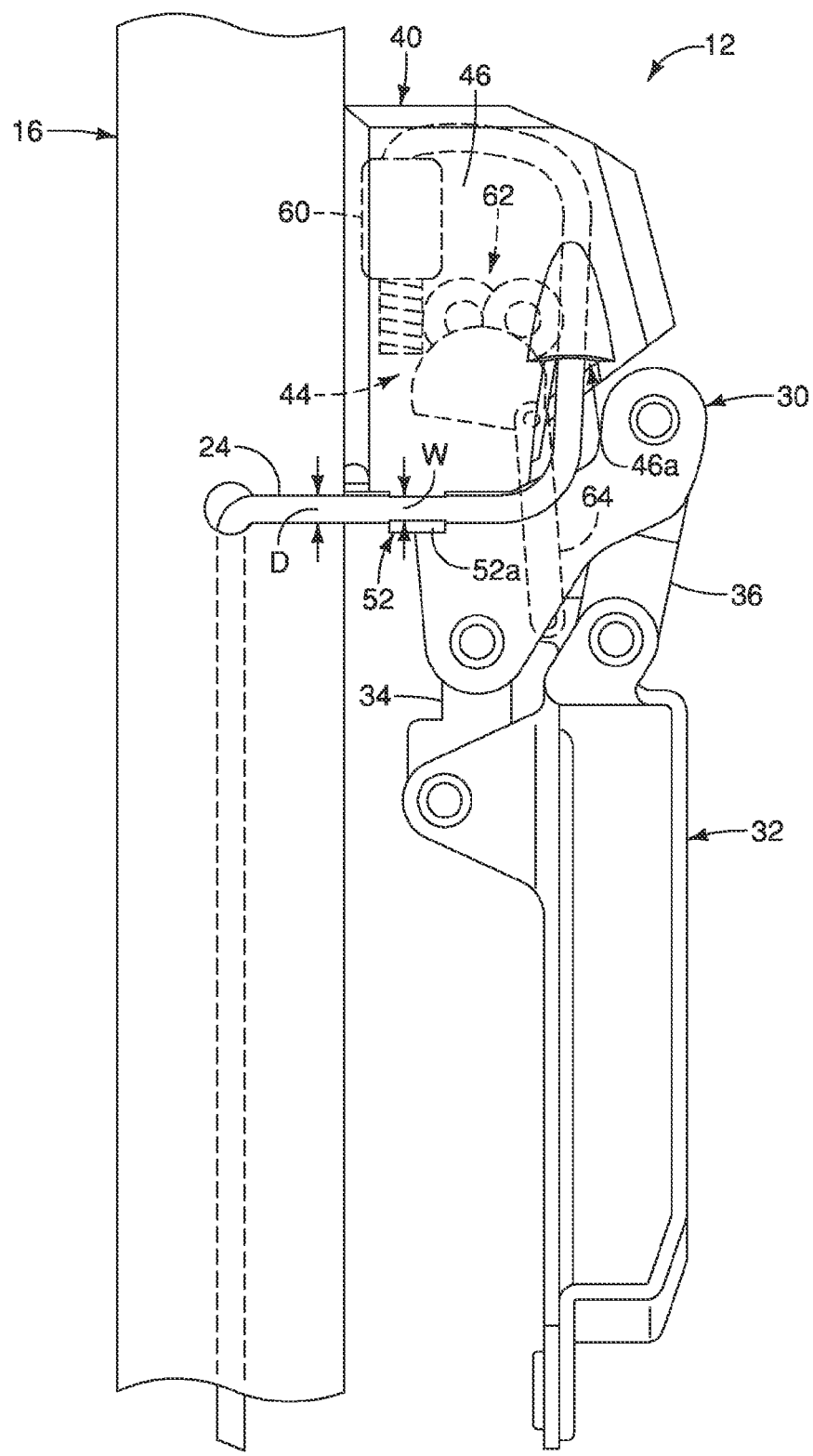
FIG. 9 is a rear side elevational view, similar to FIG. 4, of the front derailleur and a portion of the seat tube of the bicycle, but wherein the cable connector arrangement has been replaced with a direct cable connection arrangement.
Figure 10:
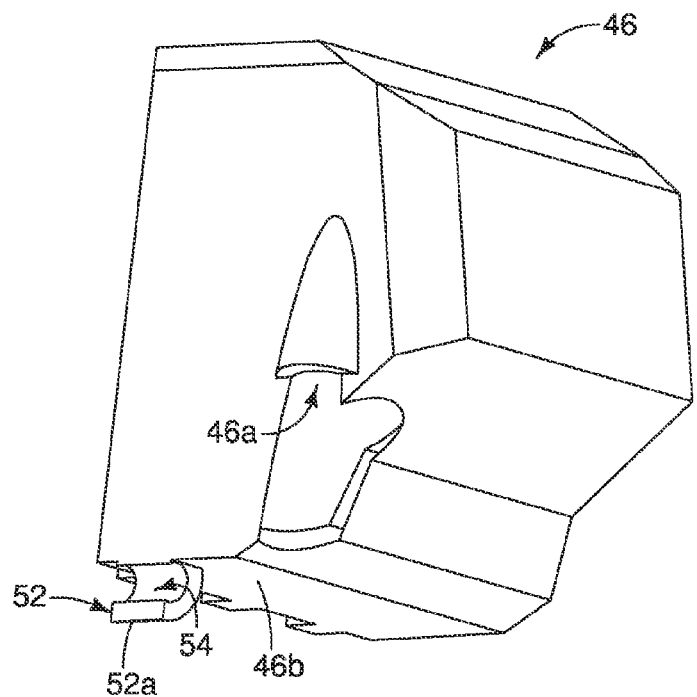
FIG. 10 is a rear side perspective view of the back cover of the actuator housing of the front derailleur.
Figure 11:
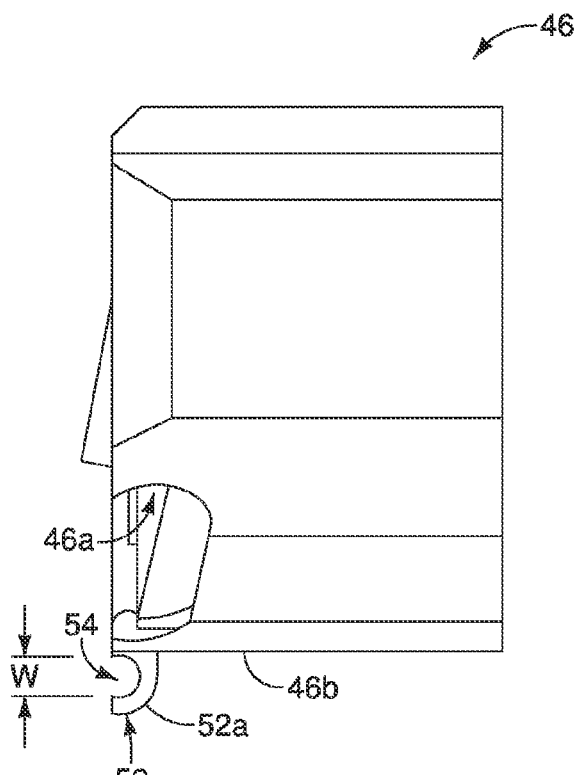
FIG. 11 is a side elevational view of the back cover of the actuator housing of the front derailleur.
Figure 12:
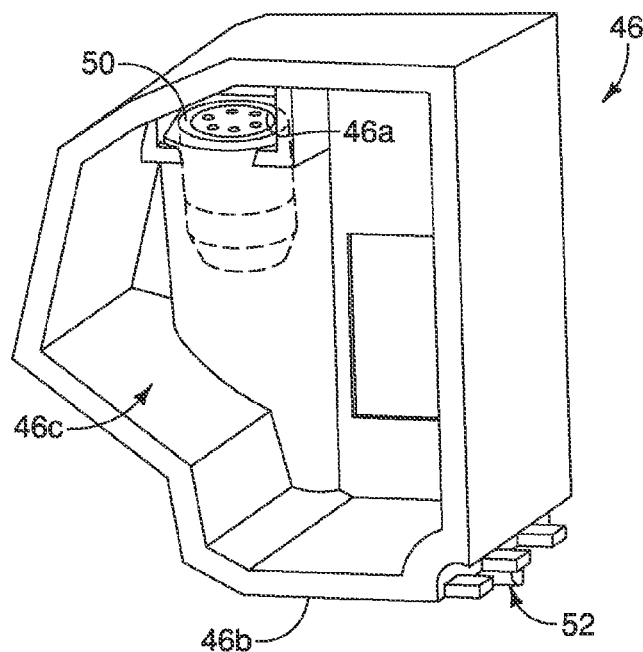
FIG. 12 is an interior perspective view of the back cover of the actuator housing of the front derailleur.
Figure 13:
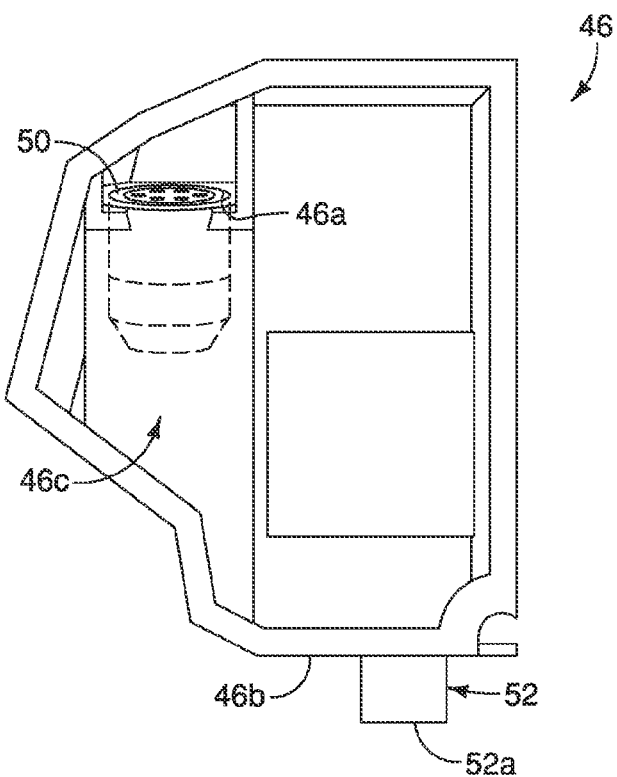
FIG. 13 is an interior elevational view of the back cover of the actuator housing of the front derailleur.

Alternatively, as seen in FIG. 9, the electrical cable 24 passes through the cable opening 46a of the back cover 46 of the housing 42, and is directly attached to the electric drive part 44. Thus, in this alternative embodiment the electric drive part 44 has an electrical cable 24 that extends from inside the housing 42 and through the opening of the housing 42. Preferably a gasket or other sealing member (not shown) is disposed between the electrical cable 24 and the surface that defines cable opening 46a.

As seen in FIGS. 10 to 13, the back cover 46 of the housing 42 has been detached from the rest of the actuator unit 40 such that the back cover 46 can be seen in more detail. In the illustrated embodiment, a cable holding member 52 is provided at an outer surface of the housing 42 of the actuator unit 40. However, alternatively, the cable holding member 52 of the housing 42 could be eliminated and replaced with a cable holding member that is formed on the base member 32 in the same area to provide similar routing of the electrical cable 24. Thus, the cable holding member 52 can be provided at one of the housing 42 of the actuator unit 40 and the base member 32 to hold a portion of the electrical cable 24 in the desired routing position.

In the illustrated embodiment, the cable holding member 52 extends downward relative to the housing 42 with the actuator unit 40 in an installed position. Preferably, the cable holding member 52 is provided as a hook shaped member that is disposed at a bottom surface 46b of the back cover 46 of the housing 42. More preferably, the cable holding member 52 is provided at a rear end portion of the bottom surface 46b of the housing 42 with the actuator unit 40 in the installed position.

The cable holding member 52 and at least the hack cover 46 of the housing 42 are integrally formed as a one-piece member from a generally rigid plastic material. While the back cover 46 is generally rigid member, the cable holding member 52 is cantilevered relative to the back cover 46 such that the cable holding member 52 can flex relative to the back cover 46. In other words, the cable holding member 52 has a resilient part 52a with respect to the back cover 46 such that the electrical cable 24 is held by a snap fit connection between the electrical cable 24 and the cable holding member 52. Thus, as seen in FIG. 4, the electrical cable 24 has a diameter D that is slightly larger than a transverse width W of an insertion opening 54 that is defined by the cable holding member 52.

Turning back to FIGS. 5 and 6, in the illustrated embodiment, the electric drive part 44 basically includes an electric motor 60, a gear reduction unit 62 and a drive link 64. Basically, the electric motor 60 drives the gear reduction unit 62 for move the drive link 64. The drive link 64 is connected to the outer link 36 to move the chain guide 32 between the retracted and extended positions.

The majority of the electric drive part 44 is contained within an interior space 46c of the back cover 46 of the housing 42. The electric drive part 44 preferably includes other conventional parts that are not being illustrated for purposes of illustration. For example, the electric drive part 44 will typically also include a position control/detecting mechanism (not shown) and one or more printed circuit boards (not shown) with a motor circuit and a position control/detecting circuit (e.g., see U.S. Pat. No. 6,162,140 and U.S. Pat. No. 7,306,531 which are both assigned to Shimano, Inc.).

In the illustrated embodiment, the electric motor 60 has an internal control unit or internal drive unit (not shown) and an electrical cable 66 extending from the internal control unit. The electrical cable 66 is connected to the cable connector 50. Thus, the electric motor 60 is electrically connected to the battery 18 and to the electric shifter 20 by the electrical cable 24. The cable connector 50 preferably has additional conductors for attaching other wires for the position control/detecting mechanism (not shown) and/or a printed circuit board (not shown). Since the electric drive part 44 is relatively conventional and can have a variety of configurations, the electric drive part 44 will not be discussed or illustrated in detail.

Figure 14:
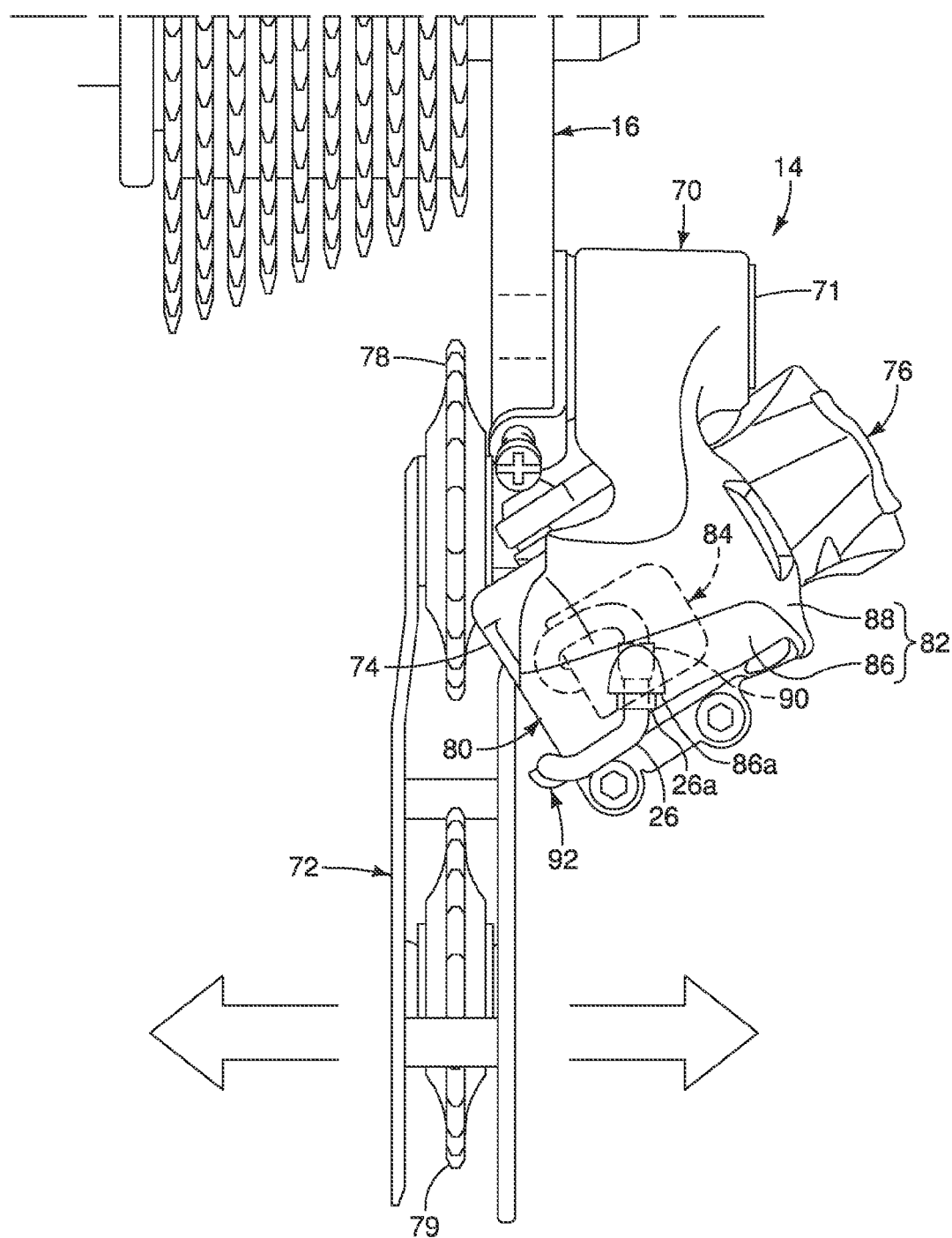
FIG. 14 is a rear side elevational view of the rear derailleur attached to a rear part of the bicycle frame of the bicycle illustrated in FIG. 1.

As seen in FIGS. 1 and 14, the rear derailleur 14 basically includes a base member 70 and a chain guide 72. The base member 70 is fixed to the bicycle frame 16 by a fixing bolt 71. The chain guide 72 is movably supported to the base member 70 to move between a retracted position and an extended position with a plurality of intermediate positions located between the retracted and extended positions. In the illustrated embodiment, the chain guide 72 is movably supported to the base member 30 by an inner link 74 and an outer link 76. The links 74 and 76 form a four bar linkage with the base member 70 and the chain guide 72. In the illustrated embodiment, the chain guide 72 is a conventional chain guide that includes a first or guide roller 78 and a second or tension roller 79. The rollers 78 and 79 correspond to roller member.

The base member 70 supports a bicycle electric actuator unit 80 (hereinafter actuator unit 80). The actuator unit 80 is operatively coupled between the base member 70 and the chain guide 72. In other words, the chain guide 72 is operatively coupled to the actuator unit 80 so as to be moved by the actuator unit 80. The chain guide 72 constitutes a driven part that is movably disposed between at least two different positions relative to the base member 70. In the illustrated embodiment, the actuator unit 80 includes a housing 82 and an electric drive part 84. The chain guide 72 is operatively coupled to the electric drive part 84 of the actuator unit 80. In particular, the chain guide 72 is moved by the electric drive part 84 of the actuator unit 80 between the retracted and extended positions. Other than the housing 82, the rear derailleur 14 can be any conventional electric rear derailleur such as, fir example, the rear derailleur that is disclosed in U.S. Pat. No. 6,162,140. Thus, the electric, drive part 84 and other parts of the rear derailleur 14 will not be discussed herein.

Here, the housing 82 has first and second covers 86 and 88. The second cover 88 is integrally formed with the base member 70, while the first cover 86 is a separate member that is attached to the second cover 48 to conceal the electric drive part 84. The first cover 86 of the housing 82 has a cable opening 86a that opens in a downward direction relative to the housing 82 with the actuator unit 80 in an installed position when the rear derailleur 14 is mounted on the bicycle 10. The cable opening 86a provides access to the actuator unit 80 for electrically connecting the electrical cable 26 to the actuator unit 80.

In the main illustrated embodiment, the housing 82 has a cable connector 90 that is installed in the cable opening 86a. The cable connector 90 faces in a downward direction relative to the housing 82 with the actuator unit 80 in the installed position. Preferably, the cable connector 90 is formed with a resilient outer cover or provided with a gasket for sealing the cable opening 96a to provide a watertight seal. The electrical cable 26 has a connecting part 26a that is detachably and reattachably connected to the cable connector 90 of the housing 82, In this way, the cable connecting part 26a of the electrical cable 26 can be plugged in the cable connector 90 and then subsequently unplugged from the cable connector 90, which remains secured in the cable opening 86a to provide a watertight seal fir the housing 82, Alternatively, the electrical cable 26 passes through the cable opening 86a of the first cover 86 of the housing 82, and is directly attached to the electric drive part 84 similar to the direct connection arrangement of FIG. 9.

In the illustrated embodiment, a cable holding member 92 is provided at an outer surface of the housing 82 of the actuator unit 80. The cable holding member 92 is functionally and structurally identical to the cable holding member 52 of the front derailleur 12. Thus, the cable holding member 92 will only be briefly discussed and illustrated herein.

Basically, the cable holding member 92 extends downward relative to the housing 82 with the actuator unit 80 in the installed position. Preferably, the cable holding member 92 is provided is a hook shaped member that is disposed at a bottom surface of the back cover 86 of the housing 82. More preferably, the cable holding member 92 is provided at a rear end portion of the bottom surface of the housing 82 with the actuator unit 80 in the installed position. The cable holding member 92 and at least the first cover 86 of the housing 82 are integrally formed as a one-piece member from a generally rigid plastic material. While the first cover 86 is generally rigid member, the cable holding member 92 is cantilevered relative to the back cover 86 such that the cable holding member 92 can flex relative to the first cover 86. In other words, the cable holding member 92 has a resilient part with respect to the first cover 86 such that the electrical cable 26 is held by a snap fit connection between the electrical cable 26 and the cable holding member 92. Thus, the electrical cable 26 has a diameter that is slightly larger than a transverse width of an insertion opening that is defined by the cable holding member 92 similar to the cable holding member 52 of the front derailleur 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle electric actuator unit. Accordingly, these terms, as utilized to describe the bicycle electric actuator unit should be interpreted relative to a bicycle equipped with the bicycle electric actuator unit as used in the normal riding position on a level surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electric actuator unit comprising:
   a housing having a cable opening;
   an electric drive part disposed in the housing and electrically connected to an electrical cable; and
   a cable holding member disposed on an outer surface of the housing and spaced from the cable opening to hold a portion of the electrical cable.

2. The bicycle electric actuator unit according to claim 1, wherein
   the cable holding member extends downward relative to the housing with the bicycle electric actuator unit in an installed position.

3. The bicycle electric actuator unit according to claim 1, wherein
   the cable holding member is provided at a bottom surface of the housing with the bicycle electric actuator unit in an installed position.

4. The bicycle electric actuator unit according to claim 3, wherein
   the cable holding member is provided at a rear end portion of the bottom surface of the housing with the bicycle electric actuator unit in the installed position.

5. The bicycle electric actuator unit according to claim 1, wherein
   the housing has a cable connector disposed in the cable opening, and
   the electrical cable is detachably connected to the cable connector of the housing.

6. The bicycle electric actuator unit according to claim 5, wherein
   the cable connector faces in a downward direction relative to the housing with the bicycle electric actuator unit in an installed position.

7. The bicycle electric actuator unit according to claim 1, wherein
   the cable opening opens in a downward direction relative to the housing with the bicycle electric actuator unit in an installed position, and
   the electric drive part has the electrical cable, the electrical cable extending from inside the housing and through the cable opening of the housing.

8. The bicycle electric actuator unit according to claim 1, wherein
   the cable holding member and at least a portion of the housing are integrally formed as a one piece member.

9. The bicycle electric actuator unit according to claim 1, wherein
   the cable holding member has a resilient part such that the electrical cable is held by a snap fit connection between the electrical cable and the cable holding member.

10. A bicycle electric front derailleur including the bicycle electric actuator unit according to claim 1, the bicycle electric front derailleur comprising:
    a base member supporting the bicycle electric actuator unit; and
    a chain guide being operatively coupled to the bicycle electric actuator unit so as to be moved by the bicycle electric actuator unit.

11. A bicycle electric rear derailleur including the bicycle electric actuator unit according to claim 1, the bicycle electric rear derailleur comprising:
    a base member supporting the bicycle electric actuator unit; and
    a chain guide being operatively coupled to the bicycle electric actuator unit so as to be moved by the bicycle electric actuator unit, the chain guide including a roller member.

12. An electric bicycle component comprising:
    a base member;
    a driven part movably disposed between at least two different positions;
    an electric actuator unit being operatively coupled between the base member and the driven part to move the driven part relative to the base member, the electric actuator unit including a housing having a cable opening, an electric drive part disposed in the housing and electrically connected to an electrical cable; and
    a cable holding member disposed on one of an outer surface of the housing of the electric actuator unit and the base member, the cable holding member being spaced from the cable opening to hold a portion of the electrical cable.

* * * * *